Dec. 15, 1942. G. GARBUIO 2,305,309
APPARATUS FOR SOLIDIFYING AND DRYING ALIMENTARY PASTES
Filed July 8, 1939 2 Sheets-Sheet 1

Inventor:
Giuseppe Garbuio
by Haseltine, Lake & Co.
Attorneys

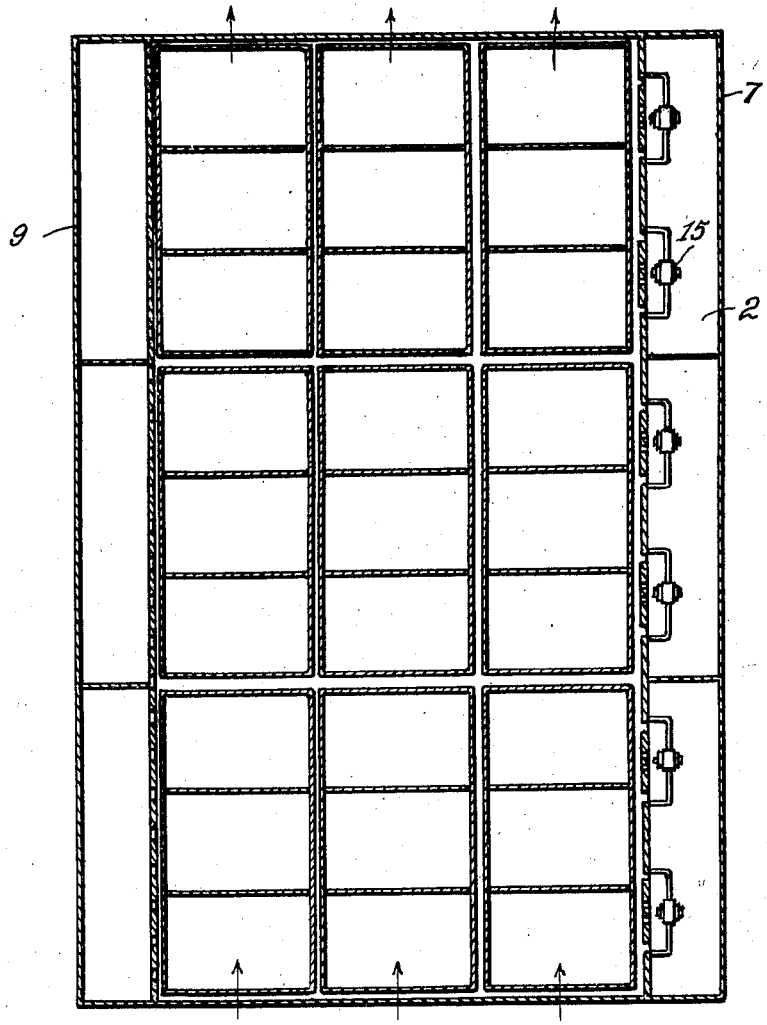

Patented Dec. 15, 1942

2,305,309

UNITED STATES PATENT OFFICE 2,305,309

APPARATUS FOR SOLIDIFYING AND DRYING ALIMENTARY PASTES

Giuseppe Garbuio, Treviso, Italy; vested in the Alien Property Custodian

Application July 8, 1939, Serial No. 283,472 In Italy January 18, 1939

5 Claims. (Cl. 34—225)

It is known that the consolidating and drying of alimentary pastes carried on long rods is actually a rather unsatisfactory method, mainly owing to the difficulty of effecting a uniform consolidation and a thorough drying when said rods are stacked in tiers in the interior of the drying chambers or cells. For this reason consolidating of the paste upon long rods is now effected in single tiers of rods which are then disposed by hand in several tiers in the interior of the driers; however, this method is neither practical nor economic as it requires, inter alia, much labor in transporting the paste rods from the machines to the consolidating apparatus by hand or by means of trolleys, in placing the rods or trolleys in said apparatus, in transporting the paste from said apparatus to the drier and in charging the rods into the drier. Moreover, much paste is detached from the rods during their transportation and handling, resulting in waste of material and labor.

With the system of consolidation upon rods arranged in one tier it is true that the paste is uniformly consolidated, but the same uniformity does not hold good for the present driers having several tiers of rods; in fact, these driers may be divided into two categories: driers working with vertical down-draft, which although they give the best results possess the drawback that the paste on the uppermost tier is dried out more rapidly, as it receives dry air, than the pastes in the other tiers which dry out more slowly as they receive air which has gradually become humidified during its passage over the pastes in the preceding tiers, secondly, driers working with horizontal draft, which for the same reason possess the drawback of the more rapid drying out of the paste located nearest the point where the ventilating air is admitted.

There is, therefore, a real need for a system of consolidating and desiccating which allows pastes carried on rods to be uniformly consolidated and desiccated when said rods are disposed in several tiers, and still more for a system which allows these operations as well as the transportation of the paste carrying rods to be effected by means of trolleys having several tiers and which may be wheeled right up to the presses or automatic alimentary paste machines.

The drier constituting the subject matter of the present invention entirely solves the problem of uniformly consolidating and desiccating the paste in several tiers of long rods, by means of special devices which allow both a vertical and a mixed ventilation to be effected, the latter consisting of a vertical and a horizontal draft produced simultaneously, the air currents produced in the two directions being variable at will and according to the amount of fresh air required.

The said drier has been designed bearing in mind that the speed of desiccation depends not only upon the temperature and dryness of the ventilating air impinging upon the paste, but also upon the quantity of air surrounding the paste, that is to say the speed of the air. Consequently, the ventilating air currents are so disposed and distributed that the paste, upon which the broken air currents successively impinge during their passage through the tiers of paste, becoming increasingly humidified in the process, is ventilated by a gradually increasing quantity of air; moreover, provision is made for the whole or a portion of the humid air to be returned to the pastes situated adjacent the air inlets inside the central chamber, in this manner delaying a too rapid desiccation of these pastes and preventing unequal desiccation in said chamber.

The said drier which may be used both for consolidating and desiccating may be charged either by hand or by means of trolleys having one or more tiers of rods; in the latter case the trolleys are as mentioned above, wheeled directly into the workshops, so that all transportation, consolidating and desiccating is always effected while the paste rods are arranged in several tiers on the trolleys. The same drier may be used also for pastes cut into small pieces, in which case trolleys carrying a plurality of trays having metallic wire mesh bottoms and so stacked as also to allow a horizontal current of air to pass between them, are wheeled into the drier, so that also in this case a uniform and perfect desiccation is obtained.

The drier constituting the subject matter of the present invention is illustrated by way of example in the annexed drawings which show an apparatus intended to be charged by means of trolleys having three tiers of rods, Figure 1 is a longitudinal vertical section of the drier as taken on line I—I in Figure 3, the valve being disposed to provide maximum renewal of air and ventilation simultaneously in vertical and horizontal direction.

Figure 4 is a horizontal section view of a plurality of juxtaposed driers constituting a tunnel for consolidating and desiccating alimentary pastes in a continuous process, by wheeling the trolleys in from one side and wheeling them out of the drier from the opposite side, carrying the uniformly consolidated or desiccated pastes.

Figure 3:
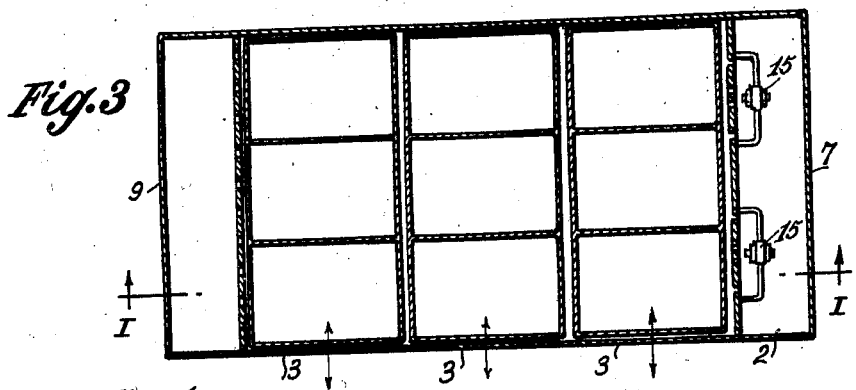
Figure 3 is a horizontal sectional view of the drier taken on line III—III in Figure 1, with the valves, etc., removed to clarify the view.

The drier which may be constructed wholly or partly of brickwork, wood or other suitable material consists of an inner or central chamber 1 provided in its front wall 2 with doors 3 through which the trolleys are wheeled in (Figure 3).

The inner or central chamber 1 is surrounded by ventilating channels 4, 5, 6, which are formed by the external walls 7, 8, 9 of the drier and by internal partitions 10, 11, 12 which may be perforated or latticed and limit the chamber 1.

In the wall 7 an opening 13 is provided which, with the aid of the funnel 14, acts as an inlet for dry air which is drawn in by one or more mechanically or electrically operated fans 15. In addition a lower opening 16 is provided as an outlet for the humid air, said opening 16 having a shutter 17.

Inside the vertical ventilation chamber 4 a valve 18 is disposed and is pivoted at 19. The valve 18 may be angularly displaced by means of the handle 20 and connecting bar 21 and cooperates with the counter-valve 22 having a fulcrum 23 and following the movements of displacement of the valve 18. The latter is furthermore connected to the shutter 17 of the outlet for the humid air, this connection being effected by means of a rope 24 and the guide pulley 25.

A valve 26, pivoted at 27, is arranged inside the horizontal ventilation chamber 5, and behind one or more fans 15 (the number depending upon the capacity of the drier) the valve being balanced by means of a counterweight 30 connected thereto by a rope 28 passing over a guide pulley 29.

Inside the vertical chamber 6 is fixed the inclined baffle plate 31 in such manner as to distribute the air, and furthermore a valve 32, pivoted at 33, is disposed therein, the free end of which is adapted to slide upon the lower surface of the balanced valve plate 26 by means of rollers 34. The valve 32 is connected to the valve 18 by the bar 35 which is pivotably joined to the lever 36, pivoted at 37 and in turn pivotably joined to the bracket 38 which is fixed on the valve 18.

Figure 1:
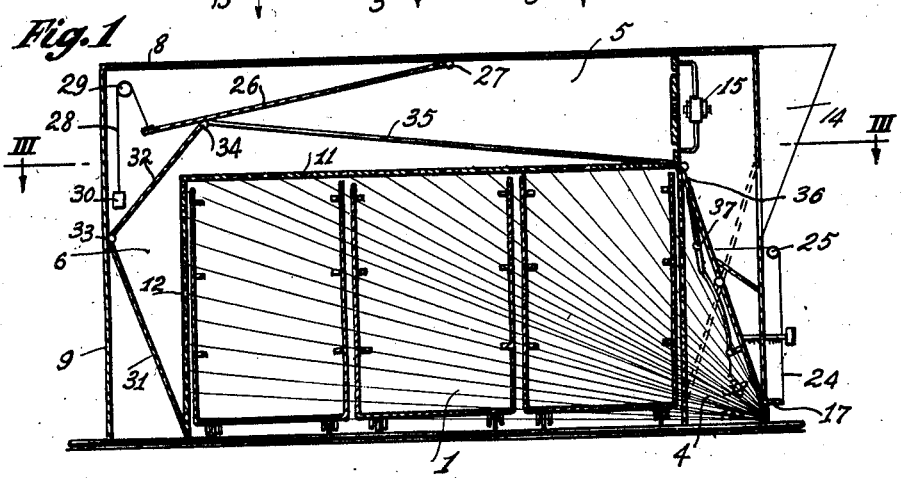

The working method of the apparatus is as follows: when the valve 18 is brought into the position illustrated in Figure 1 by means of the handle 20, the valve 32 is pivoted back so that air is also admitted to the vertical ventilation channel 6, the valve 26 being simultaneously raised, this movement being assisted by the action of the counterweight 30. In these circumstances the fan or fans 15 aspirate dry air through the funnel 14 and the opening 13, compress it in the channels 5 and 6 and force it through the perforated or latticed partition walls 11, 12, whilst the inclined valves 26 and 32 and the plate 31 take care of uniformly distributing the air over the entire surface of said partition walls 11, 12.

Figure 2:
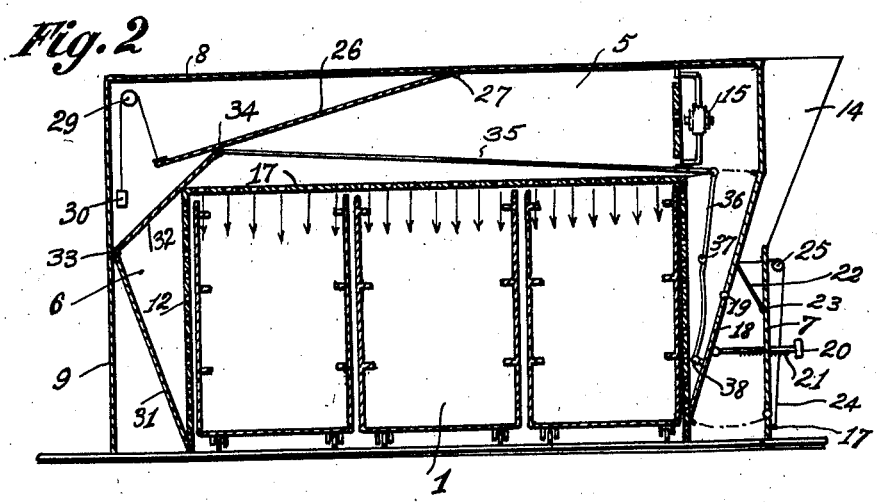
Figure 2 is the same sectional view in which the valve is disposed to provide vertical ventilation and internal circulation only, i. e. without renewal of air.

After passing over the paste, the air passes through the perforated or latticed partition 10 and is collected and conveyed from the inclined valve 18 in the direction of the outlet opening 16, the shutter 17 of which is wide open. As will be evident from Figure 1, the volume of air in contact with the paste gradually increases and becomes humidified during its passage through successive tiers of paste, that is to say the humidity of the air increases as the distance of the broken air currents from the tier at the air inlet increases. When the valve 18 is displaced to the position illustrated in Figure 2 by means of the handle 20 and rod 21, the fan or fans 15 are now unable to aspirate air through the opening 13 and the humid air after passing between the tiers of paste cannot escape through the opening 16 which is now entirely closed by the shutter 17. In this position of the valve 18, the valve 32 is displaced forwardly thus closing the opening between the ventilation channel 5 and the vertical ventilation channel 6, and the valve 26 is also lowered. In these circumstances the fan or fans 15 aspirate, through the ventilation channel 4, all the humid air which has passed through the tiers of paste and again force it through said tiers this time in the vertical direction only, thus establishing a closed circuit of ventilation. In these circumstances the paste on the upper tier of carrier rods cannot be desiccated to a greater extent than the paste on subjacent tiers, since the entire quantity of humid air is fed back to the first mentioned upper tier, so that as the air becomes saturated with humidity a balance is established throughout the entire mass of paste, and this constitutes the feature of the invention.

From the foregoing description it is evident that by adjusting the valve 18 by means of the handle 20 and rods 21 to a position approximately midway between the above described extreme positions, for example to a vertical position, it is possible to create intermediate conditions, which in all cases ensure uniform desiccation of the entire mass of paste.

By arranging a plurality of driers of the type described in juxtaposition as illustrated in Figure 4, a tunnel may be provided having a width corresponding to the width of one or more trolleys and utilizable both for consolidating and for desiccating long lengths or short pieces of alimentary paste, so that trolleys which are wheeled in from one side and emerge at the opposite side carry uniformly consolidated or desiccated paste, thus effecting a continuous consolidation and desiccation process.

The number of trolleys and of compartments for accommodating them, the dimensions, the details of shape and features hereinbefore described are of course only approximate and given merely by way of example.

What I claim and desire to secure by Letters Patent of the United States is:

1. A drier for consolidating and desiccating alimentary pastes comprising an inner chamber limited on two substantially upright sides and one substantially horizontal side by perforated partitions, means arranged in a wall of said chamber to allow said alimentary pastes to be inserted into said chamber in tiers or in trays having metallic wire mesh bottoms, an outer chamber having corresponding outer walls spaced from said partitions to form one substantially horizontal and two substantially upright ventilating channels around said inner chamber, means for drawing dry air into one of said vertical ventilating channels and for pumping said air into the other two of said channels and thence through the said perforated partitions and over the said pastes arranged in the said inner chamber in said tiers or trays, movable valvmeans pivotally arranged in the said one or first upright channel into which the dry air is drawn to regulate the supply of said dry air from an opening in one of said outer walls, further movable valve means arranged in the horizontal channel for controlling flow of air through the latter, a third valve means connected with the first mentioned valve means and pivotally mounted in a position to open the second upright channel when said first valve means connects said opening with the first channel in order to ensure the uniform distribution of said dry air over the entire surface of said partition walls, said third valve means making contact with said further or second movable valve means to open the same simultaneously therewith, closable valve means for evacuating the air through a second opening in said one outer wall after it has passed through said pastes, said closable valve means being connected to and controlled by the first mentioned valve means, and hand operated means for moving said first mentioned valve means to establish a closed circuit of ventilation whereby the humid air, after it has passed through the pastes, is returned through said pastes in the vertical direction, the supply of dry air being shut off.

2. A drier for consolidating and desiccating alimentary pastes comprising an inner chamber limited on two substantially upright sides and one substantially horizontal side by perforated partitions, means arranged in a wall of said chamber to allow said alimentary pastes to be inserted into said chamber in tiers or in trays having metallic wire mesh bottoms, an outer chamber having corresponding outer walls spaced from said partitions to form one horizontal and two substantially upright ventilating channels around said inner chamber, means for drawing dry air into one of said substantially upright ventilating channels and for pumping said air into the other two of said channels and thence through the said perforated partitions and over the said pastes arranged in the said inner chamber in said tiers or trays, closable valve means controlling an opening in one outer wall of said upright channel for evacuating said air after it has passed through said pastes and become humidified, a valve member disposed in the upright channel within said one outer wall and simultaneously regulating the admission of the dry air and the evacuation of said humid air through a second opening in said one outer wall and connected to said closable valve means so as to close the same simultaneously with itself, two further movable inclined valve members located in and controlling the other two ventilating channels for regulating the ratio between the horizontal and vertical air currents passing through said perforated partitions, rod means connecting one of the two last mentioned valve members to said first mentioned valve member, said one of the two last mentioned valve members having a portion which abuts slidably against an intermediate portion of the other of said two last mentioned valve members, so that closure of the first mentioned valve member will cause simultaneous closure of said two further valve members together with closure of said valve means, and hand operated means for adjusting the position of said first-mentioned valve member from open toward closed position, and vice versa.

3. A drier according to claim 1, wherein the further moveable valve means in the horizontal channel has counter-balancing means and the upper end of the third valve means engaging against an intermediate portion of said further valve means so that upward movement of the third valve means will cause raising of the further valve means in the horizontal channel and allow air to pass from said horizontal channel into the upright channel in which said third valve means is moveable.

4. A drier according to claim 1, wherein the further moveable valve means in the horizontal channel has counter-balancing means and the upper end of the third valve means engaging against an intermediate portion of said further valve means so that upward movement of the third valve means will cause raising of the further valve means in the horizontal channel and allow air to pass from said horizontal channel into the upright channel in which said third valve means is moveable, and wherein a lever is connected at one end to the first mentioned moveable valve means and the other end of said lever has a link connecting the same to one end of the third valve means so that movements of said first mentioned valve means will cause corresponding movement of the third valve means.

5. A drier according to claim 1, wherein the further moveable valve means in the horizontal channel has counter-balancing means and the upper end of the third valve means engaging against an intermediate portion of said further valve means so that upward movement of the third valve means will cause raising of the further valve means in the horizontal channel and allow air to pass from said horizontal channel into the upright channel in which said third valve means is moveable, and wherein the further valve means in the horizontal channel partly overlaps and rests upon the upper end of the third valve means, both of said valve means being inclined in closed position.

GIUSEPPE GARBUIO.